(No Model.) 4 Sheets—Sheet 3.
H. H. EDGERTON.
APPARATUS FOR THE MANUFACTURE OF ILLUMINATING GAS.
No. 339,748. Patented Apr. 13, 1886.
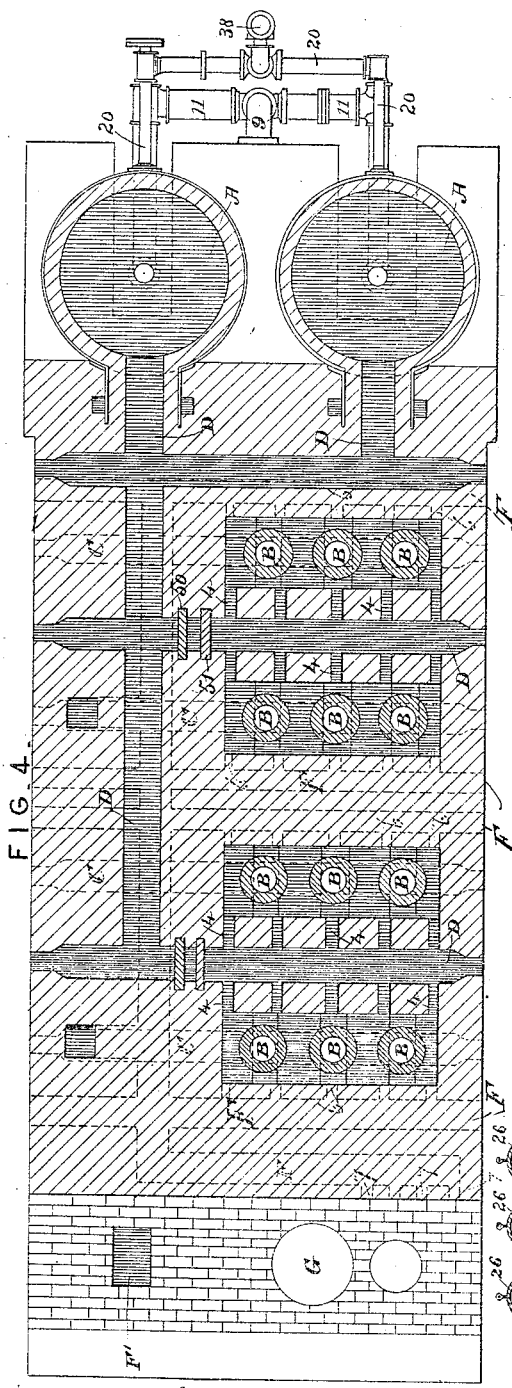
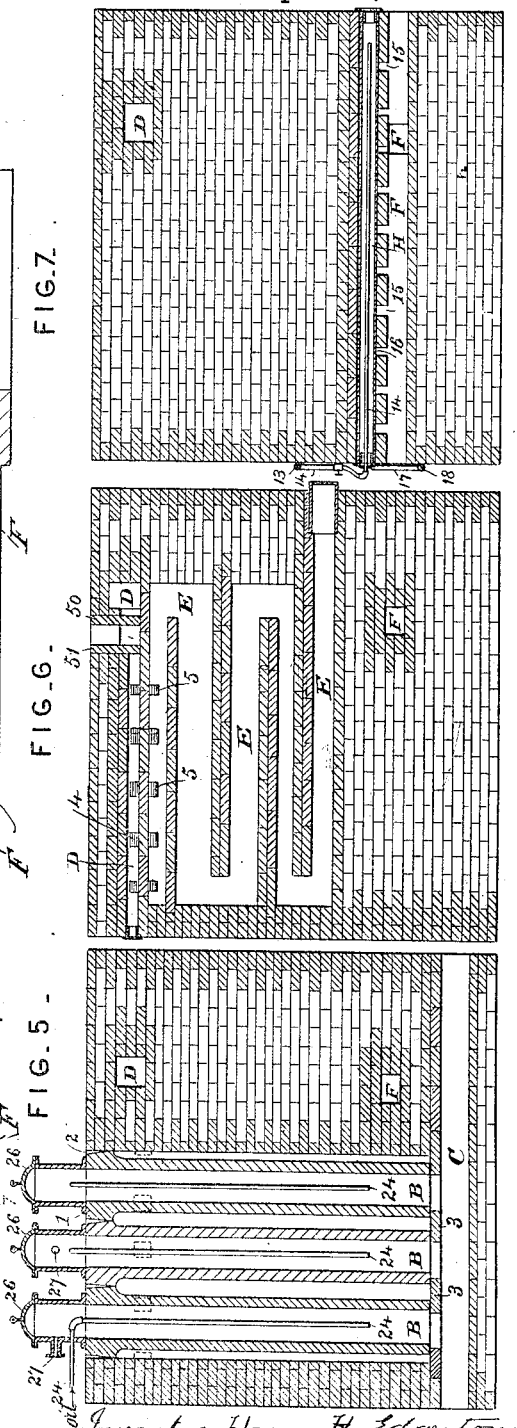

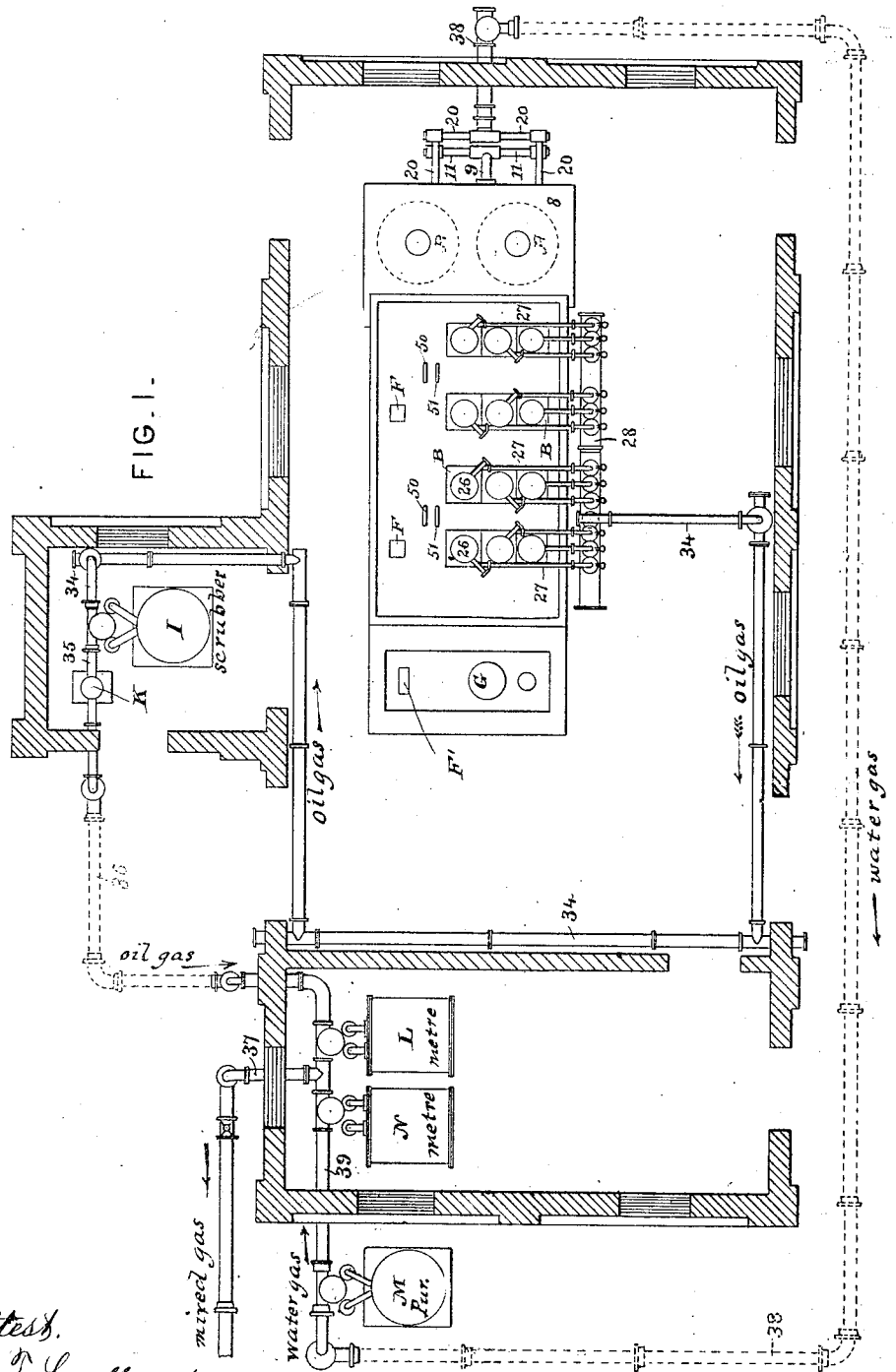

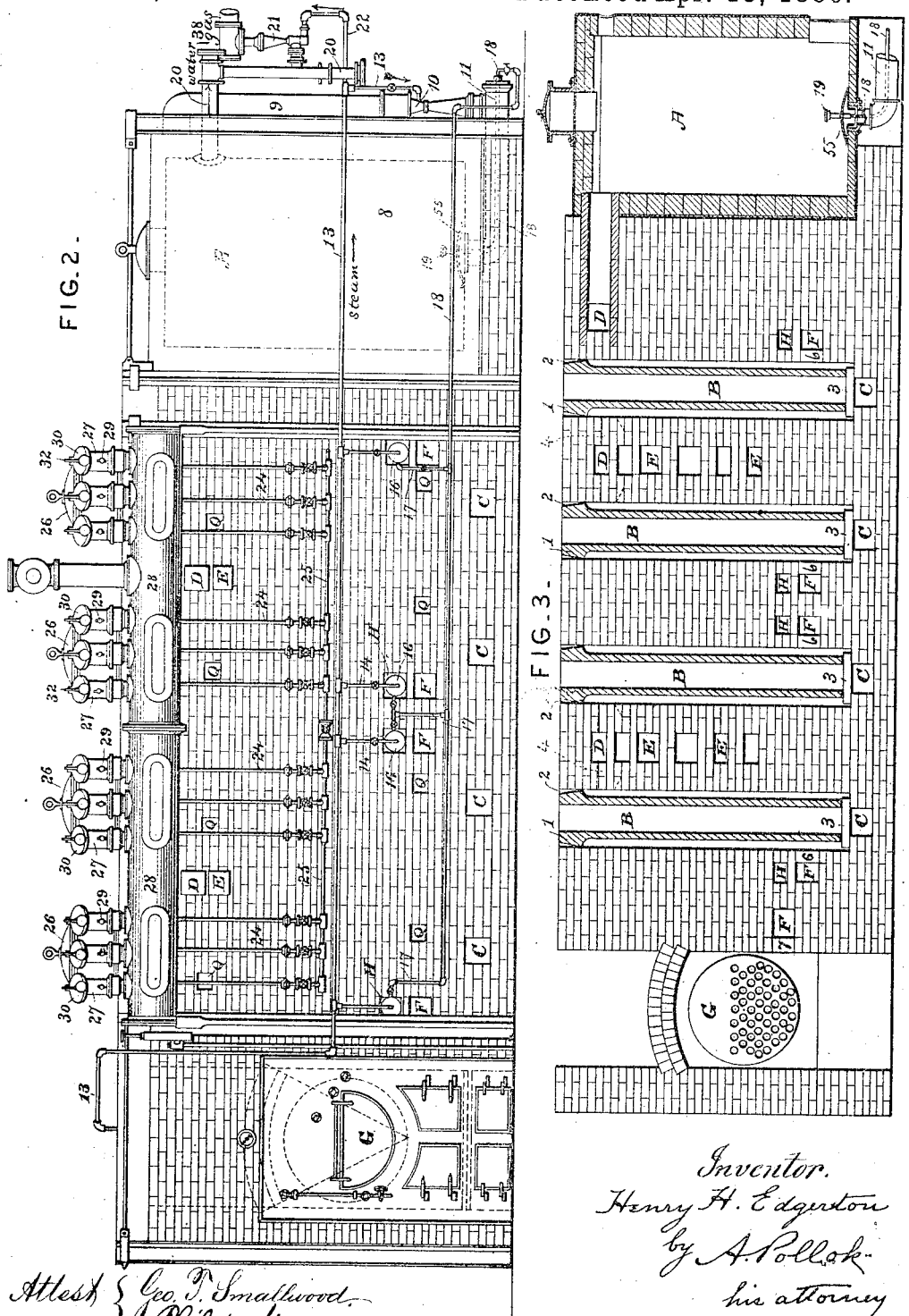

(No Model.) 4 Sheets—Sheet 4.
H. H. EDGERTON.
APPARATUS FOR THE MANUFACTURE OF ILLUMINATING GAS.
No. 339,748. Patented Apr. 13, 1886.
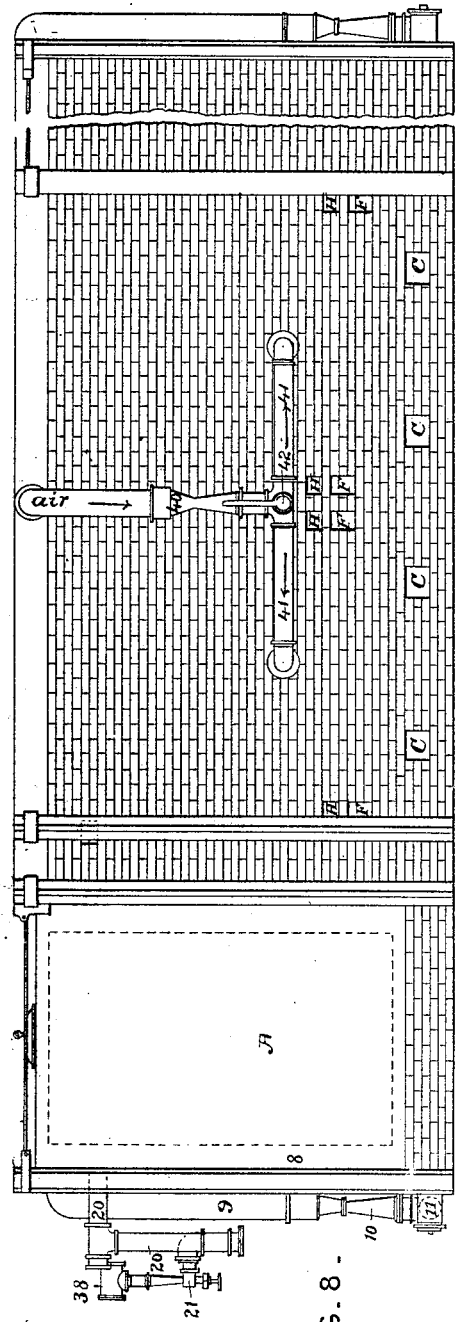
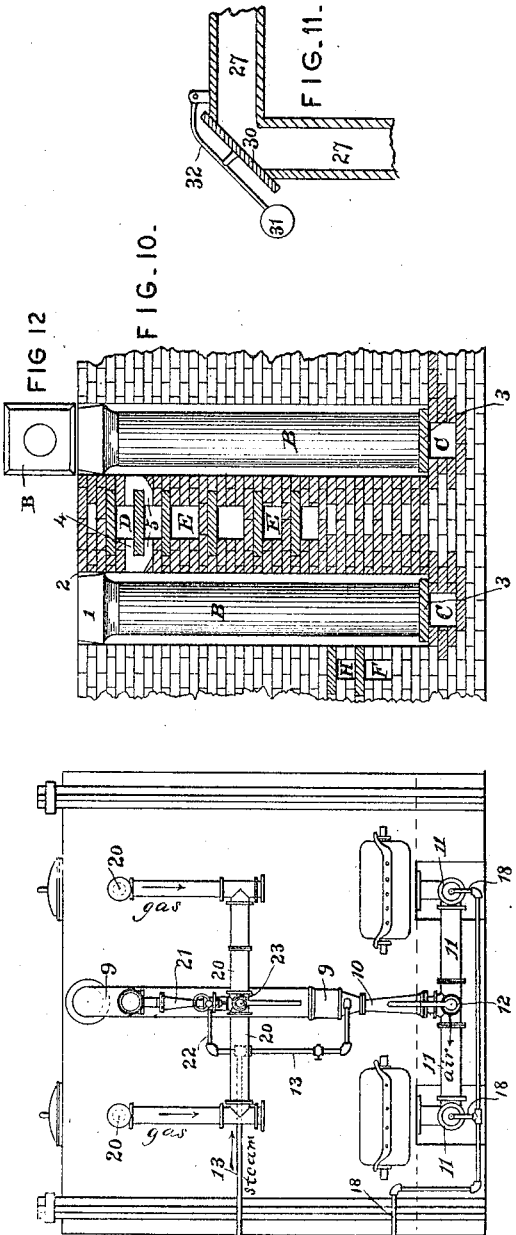
Attest.
Geo. T. Smallwood.
Philip Mauro.
Inventor
Henry H. Edgerton
by A. Pollok
his attorney

UNITED STATES PATENT OFFICE.

HENRY H. EDGERTON, OF DANBURY, CONNECTICUT.

APPARATUS FOR THE MANUFACTURE OF ILLUMINATING-GAS.

SPECIFICATION forming part of Letters Patent No. 339,748, dated April 13, 1886.

Application filed July 26, 1884. Serial No. 138,836. (No model.)

*To all whom it may concern:*

Be it known that I, HENRY H. EDGERTON, of Danbury, in the county of Fairfield and State of Connecticut, have invented a new and useful Improvement in Apparatus for the Manufacture of Illuminating-Gas, which improvement is fully set forth in the following specification.

This invention relates more particularly to the production of illuminating-gas by the combination or admixture of a non-luminous or comparatively non-luminous gas—such as water-gas, for example—with a gas rich in light-giving elements, such as oil-gas. It comprises new methods of and apparatus for generating water-gas and oil-gas, and for mixing them with each other. The water-gas, as customary, is generated in cupolas or stacks, in which the carbon is raised to a high temperature by the combustion of the charge itself, and the oil-gas is generated in close externally-heated retorts, as is also common.

The invention consists, first, in forcing the air by a blower or compressor through the charge in the cupolas, so as to form a heating-gas, burning this gas with air to heat the retorts, and finally utilizing the waste heat of the burning gases to generate the steam for use in the process, and also in the special arrangement of cupolas, retorts, flues, and boilers for accomplishing that purpose.

The invention consists, secondly, in superheating the steam to be decomposed in the cupolas by the same gases that heat the retorts, and in the special arrangement of flues for the purpose.

The invention consists, thirdly, in a special mode of taking off the water-gas from the cupola or generator. In the generation of this gas air is first passed through the charge of coke until it is brought to a white-heat. Then the air is shut off and steam admitted. The water-gas or mixture of hydrogen and carbonic oxide resulting from the decomposition of the steam by the heated carbon is drawn off in a different direction from the air-gas or mixture of carbonic oxide and nitrogen resulting from the previous combustion of the coke. Two or more cupolas are employed, one or more being used to generate air-gas for heating the retorts, while the others are used to generate water-gas. Heretofore the cupola or cupolas while generating water-gas have been cut off from the others by closing and opening valves in the outlet-flues. By the new mode of working no valves in the flues are required; but without their aid (the connection between the cupola and the air-gas flues remaining always open) the water-gas is or may be drawn off independently of the air-gas from the other cupola or cupolas, or more or less of it may be allowed to pass with the air-gas into the flues for heating the retorts. This separation or regulation is effected by maintaining the pressure of the water-gas in the upper part of the cupola so as to balance the pressure of the air-gas. An ejector is provided to draw off the water-gas, and the pressure can easily be regulated to prevent the entrance of air-gas by turning the steam-cock of this ejector.

The invention also consists in a special upright retort for the manufacture of the oil-gas, and in particular constructions, combinations, and arrangements of parts, as hereinafter explained.

The accompanying drawings represent a plant or apparatus constructed in accordance with the invention.

Figure 1 is a plan view of the complete works, except the gas-holders and supply-tanks. The other figures show on a larger scale the generators, Fig. 2 being a front view, Fig. 3 a vertical longitudinal section, Fig. 4 a horizontal section, Figs. 5, 6, and 7 vertical cross-sections in different planes, Fig. 8 an end view, Fig. 9 a back view, Fig. 10 a partial view in vertical longitudinal section, and Fig. 11 a detail view. Fig. 12 is a plan view of one of the retorts.

In the apparatus shown there are two cupolas or water-gas generators, and two benches of six retorts each. The cupolas A are or may be of any ordinary or suitable construction. The retorts B are new in their construction and setting. They are made of fire-clay or other suitable material, are of a general cylindrical form, but at one end are each provided with a squared enlargement, 1, of frusto-pyramidal form. The object of the enlargement is to enable the surrounding brick-work to be more easily fitted around the mouth of the retort, and also to enable a series of retorts to be placed side by side without intervening brick or tile work.

The object of the tapering or frusto-pyramidal form is to give wedge-shaped packing-spaces 2 between the sides of the enlargement and the inclosing-wall.

The retorts are preferably arranged upright. Their lower edges rest upon tiles 3 above a flue, C, running from front to back of the bench. The interior of the retort is in free communication with this flue. (See Fig. 5.) Both it and the lower part of the retort are filled with sand or similar granular packing material, so as to close the lower end of the retort.

The object of the sand-flues C is to permit the sand to be removed whenever desired. The ends of the sand-flues are or may be closed in any ordinary way.

In the upper part of the brick-work are the air-gas or heating-gas flues D, which take the gas from the upper part of the cupolas A and deliver it by lateral branches into the spaces around the retorts B by the ports 4. (See Figs. 3, 4, and 10.) Just before the gas enters these spaces it meets a current of hot air escaping through the ports 5 from one of the flues E. These flues E, of which there is one to each bench of retorts, zigzag back and forth through the brick-work (see Fig. 6) alongside of the retort. The air is therefore very highly heated by the time it reaches the ports 5 and meets the heating-gas. The combustion of the heating-gas goes on in the confined spaces around the retorts. The products of combustion or waste gases escape at the bottom of the retort-chamber, by the ports 6 of the take-off flue F, (see Fig. 4,) which has a series of lateral branches communicating with the different retort chambers or spaces surrounding the retorts. The flue F delivers the waste gases through the ports 7 into the fire-chamber of boiler G, (shown as a tubular boiler,) which supplies steam for various purposes. After passing through the boiler the gases escape, very much reduced in temperature, by a suitable chimney or uptake, F'.

The air for generating the air-gas or heating-gas is taken from the space surrounding the cupolas between their walls and the square or rectangular inclosing-case 8 of metal. It is drawn through the pipe 9, and by means of an ejector or steam-jet compressor, 10, is forced through the pipe 11 into the lower part of the cupola. The same ejector feeds the air into both cupolas, a three-way cock, 12, (see Fig. 9,) serving to establish the desired connection.

The use of an ejector or other compressor or air-forcing apparatus is essential in order to heat the boiler with the waste gases, for, as their temperature is much reduced in passing through the boiler, they would not by rising through a chimney produce sufficient draft through the cupolas and retort-chambers to carry on the gas-manufacture. The ejector is supplied with steam from the boiler G through the pipe 13. It is of course decomposed in the cupola, and the products of decomposition pass with the air-gas into the flues D.

The air for burning the gases in the retort-chambers is drawn from the space above the bench, (although it may be taken from any other suitable place,) and is forced by the ejector or compressor 40 (see Fig. 9) through the pipes 41 into the hot-air flues E. A three-way cock is placed at 42, so that the supply to either of the flues may be cut off independently of the others, or both flues can be supplied at the same time.

The steam for generating the water-gas is taken from the pipe 13 by the branch pipes 14, and it is superheated before it is admitted into the cupolas. For this purpose superheating-chambers H, extending from front to back of the bench-work, (see Fig. 7,) are formed above the branches of the takeoff flue F. These chambers communicate with the said flue by the openings 15 in the bottom of the chambers. They do not, however, form a part of the flue, so that there is no direct circulation through them; but the superheating-pipe 16, which is placed in each chamber, is heated mainly by radiation. There is of course an indirect circulation through the chambers, caused by differences in the temperature. The pipe 16 rests upon the bottom of the superheating-chamber and contains the pipe 14, which conveys the steam to the back and there delivers it into the pipe 16. The superheated steam escapes by the branch pipe 17. The pipes 16 are closed at both ends. The branch pipes 17 connect with the pipe 18, which (passing through the middle of the air-pipe 11,) delivers the steam to the rose or perforated distributer 19 in the lower part of the cupola. The steam escapes through the openings in the rose or distributer into the incandescent coke. The air passes around the edges of the arched plate 55, which supports the rose or distributer. The pipe 18 has of course a branch for each cupola, and both it and the other steam-pipes are provided with sufficient valves or cocks to regulate the supply. The water-gas from the decomposition of the superheated steam is drawn off from the upper part of the cupola through the pipe 20 by the ejector or aspirator and compressor 21, supplied with steam from the branch 22 of the steam-pipe 13. A three-way cock, 23, (see Fig. 9,) puts whichever cupola is desired into communication with the ejector. It is evident that so long as the pressure of water-gas in the top of one cupola balances the pressure of the air-gas in the other no air-gas will enter the water-gas generator, and that whenever the pressure in the latter becomes the greater more or less water-gas will enter the flues D and be burned with the air-gas in the retort-chambers for heating the retorts. By regulating the steam-supply of the ejector 21 the pressure in the cupola generating water-gas can be controlled so as to take off the water-gas without admixture, and if more water-gas is generated than can be usefully employed for mixing or other purpose, to allow the excess to pass into the flues D. The oil or hydrocarbon (naphtha, for example) is fed under pressure—say, that of twenty feet (more or less) of water—and is supplied to each retort by a separate pipe, 24, provided with a regulating-cock and branching from the main oil-pipe 25. Each pipe 24 passes through the cover 26, bolted on the top of the retort, and descends almost to the bottom of the same, terminating a short distance above the sand. The oil is vaporized as or immediately after it escapes from the supply-pipe 24, and passing through the retort escapes by the outlet-pipe 27, which communicates with the hydraulic main 28. This outlet is provided with a test-opening or petcock at 29 for giving the indications necessary to regulate the supply of oil or hydrocarbon, as described in Letters Patent No. 274,443, granted to me March 20, 1883. At the bend in each pipe 27 is a flap or cover, 30, placed over an opening in the pipe, and held to its seat by the weight 31 at the end of lever 32, fulcrumed at 33 to lugs on the pipe. By raising the weight the flap or cover can be removed to permit clearing of the pipes should they accidentally become clogged.

The rich oil-gas from the hydraulic main is carried by the pipe 34 into the condenser and scrubber I, preferably such as described in my aforesaid patents, and thence by the pipe 35 to a second and smaller condenser, K, pipe 36, and meter L, to the pipe 37, where it meets the water-gas which has passed by way of the pipe 38, purifier M, pipe 39, and meter N. The pipe 37 conveys the mixed gases to the gas-holder. Of course any ordinary or suitable purifiers may be used for the oil and water-gas. The object of using the meters is to insure the use of the proper relative quantities of the two gases.

In order to cut off the heating-gas from either bench of retorts, so that the other may be used alone, the flue D leading to each bench is provided with a damper of a special construction. It consists of two slides, 50 and 51, with a filling of sand between them. Of course the filling of sand is used only when it is desired to cut off the supply. When it is desired to open the communication, the sand is scooped up, one slide is raised entirely and the other is raised more or less, to regulate the flow so that the gas may be distributed properly between the two benches. In front of the brick-work surrounding the retorts are a number of peep-holes, Q, for observing the inside of the retort-chambers.

It is obvious that modifications may be made in the details of construction without departing from the spirit of the invention, and that parts of the invention may be used separately.

It may be here observed that gas apparatus has been devised in which retorts are heated by air-gas from cupolas, and the hot gases, after enveloping the retort, are passed through a boiler to generate steam; but in this apparatus the flues for conducting the water-gas from the cupolas communicate with the interior of the retorts, so that the water-gas will be mixed with the oil or with hydrocarbon vapors generated in the retorts, the mixture being exposed to a very high heat in order to decompose the vapors into fixed gas in presence of the water-gas. In my invention, on the other hand, the retorts are wholly cut off from the cupolas, and the rich oil-gas is generated independently.

The foregoing gas apparatus is believed to be subsequent to my invention; but whether later or earlier is immaterial, since it differs, as stated, from what I claim.

It may be observed, also, that it has been proposed to generate and purify water-gas, and then having carbureted said water-gas to pass the mixture through a fixing-retort. The plant for this purpose differs from that of my invention in that in the former the pipes for conveying the water-gas lead (through a carbureter) into the fixing-retort, where the oil or oily vapors are decomposed, whereas in my plant the oil-gas and water-gas generators are independent, and deliver their gases into separate pipes, to be mixed only after passing the separate purifiers and meters.

The heating of the mixed gases or of the water-gas mixed with vapors I find to be very wasteful and not at all desirable.

In the former plant for carbureting water-gas and then passing it into a hot retort to decompose the hydrocarbon vapor into fixed gas no meters are used, and, in fact, they could not be usefully employed, because the quality of the gas is not dependent simply upon the quantity of water-gas admitted, but also upon the decompositions which take place in the fixing-retort.

Having now fully described my said invention and the manner of carrying the same into effect, what I claim is—

1. The combination, with the cupolas, retorts, and steam-boiler, of one or more compressors or steam-ejectors for creating a strong current through said cupolas, the retort-chambers, and the steam-boiler, said cupolas being connected with said retort-chambers by flues for delivering the air-gas into the chambers, and being further provided with separate flues for carrying off the water-gas, and the said retorts being adapted to the separate manufacture of a rich gas, and therefore having no communication with either the retort-chambers or the water-gas flues, substantially as described.

2. The combination, with the cupolas and retorts, of the flues formed in the brick-work surrounding the retorts for conveying the heating-gas, the retort-chambers, and the hot-air flues also formed in the brick-work aforesaid, substantially as described, so that the retorts are heated by the combustion in the retort-chambers of the gas from the cupolas by means of the hot air from said flues, as set forth.

3. The combination, with the cupolas and retorts, of the compressor or steam-ejector for forcing air into said cupolas, the retort-chambers, the flues for conveying the heating-gas from the cupolas into the retort-chambers, the hot-air flues, and the compressor or steam-ejector for forcing the air into said flues, both the heating-gas flues and the hot-air flues being formed in the brick-work surrounding the retorts, substantially as described.

4. The combination, with upright retorts set in brick or tile work, of heating-gas flues formed in the said brick or tile work, the zigzag hot-air flues also formed in said brick or tile work alongside the retorts, and the take-off flues, the three sets of flues all communicating with the retort-chambers, substantially as described.

5. The combination, with the cupolas, retorts, retort-chambers, and steam-boiler, of the compressor for forcing air into said cupolas, the flues for conveying the gas therefrom into the retort-chambers, the zigzag hot-air flues formed in the brick or tile work of the retort sitting alongside the said retort-chambers, the compressor for forcing air into said flues, and the take-off flues connecting the retort-chamber with the steam-boiler, substantially as described.

6. The combination of the cupolas, retorts, retort-chambers, air-gas flues leading from the cupolas into said retort-chambers, and hot-air flues also leading into the retort-chambers, but from a source of fresh air and not from the cupolas, of the superheaters set in the brick or tile work of the retorts, and pipes for delivering the superheated steam into the cupolas, substantially as described.

7. A superheater consisting of a chamber placed adjacent to a flue for conveying hot gas, and communicating with the same through openings in the intermediate wall, and the superheating-pipes in said chamber, so that said pipes are heated by radiation and convection, and not by the direct circulation over them of the gases in said flue, substantially as described.

8. The combination, with the retort-chambers, the heating-gas flues, the hot-air flues, and the take-off flues, of the superheating-chambers placed adjacent to said take-off flue, and communicating therewith through openings in the wall between, and the superheating-pipes in said chambers, substantially as described.

9. The combination, with the cupolas or air and water gas generators, and the common flues for carrying off the air-gas from said cupolas, of the aspirator and connected pipes for drawing off the water-gas from either cupola and at the same time controlling or regulating the pressure therein, so as to enable the user to withdraw the water-gas independently of the air-gas without closing the communication between the cupolas, said pipes leading directly from the cupolas to the aspirator, and thus constituting simply conveyers to the water-gas, in contradistinction to pipes or passages constituting or forming part of vaporizing and fixing retorts, substantially as described.

10. In the manufacture of water-gas in connected generators by raising the coke to incandescence and admitting steam into contact with the incandescent coke alternately in the generators, the improvement consisting in maintaining and regulating the pressure of the water-gas in the generator at or above the pressure of the air-gas in the other generator, so that the water-gas may be drawn off independently without closing the communication between the two generators, and when desired may be delivered in greater or less quantities into the flues for carrying off the air-gas, substantially as described.

11. A gas-retort of general cylindrical form having the walls thickened at the mouth to constitute an exterior enlargement, the cylindrical bore extending from end to end of the retort, substantially as described.

12. A gas-retort of general cylindrical form having the walls thickened at the mouth to constitute an exterior enlargement, the said enlargement being squared, and the cylindrical bore extending from end to end of the retort, substantially as described.

13. A gas-retort provided at the mouth with an enlargement of frusto-pyramidal form, substantially as described.

14. In combination with a retort-chamber having rectangular openings, a series of upright cylindrical retorts each having at its mouth a squared enlargement and set in said chamber, substantially as described.

15. In combination with a retort-chamber, one or more retorts set therein and packed as explained, each retort having at the mouth an enlargement of tapering or frusto-pyramidal form, whereby wedge-shaped packing-spaces are left around the same, substantially as described.

16. The combination, with one or more retorts open at the inner end, of the sand-flue entering beneath the same and communicating with the interior of said retorts, substantially as described.

17. The combination, with the retort-chamber, the series of upright retorts, and the sand-flue under said retorts, substantially as described.

18. In the manufacture of oil-gas, an upright retort, in combination with the sand-packing for closing the lower end, and the supply-pipe descending to within a short distance of said sand, substantially as described.

19. The combination of the cupolas, the upright retorts, the retort-chambers, the heating-gas flues, the hot-air flues, and the take-off flues, the three sets of flues being formed in the brick or tile work surrounding the retorts and built up against the cupolas, substantially as described.

20. The combination of the cupolas, upright retorts, heating-gas flues, hot-air flues, take-off flues, superheater and steam pipes, substantially as described.

21. The combination of the cupolas, air-compressor, water-gas aspirator, heating-gas flues, hot-air flues, compressor for forcing air into said hot-air flues, retort-chambers, upright retorts, take-off flues, superheaters, boiler, steam-pipes, and oil-supply pipes, substantially as described.

22. In a gas-flue, a damper composed of slides with a filling of granular material—such as sand—between them, substantially as described.

23. A plant for making a mixture of oil-gas and water-gas, consisting of the cupolas or water-gas generators, the oil-gas retorts, the separate purifiers, separate meters, and separate conveying-pipes for the two gases, and the common pipe for receiving and carrying away the gases after passing the meters, substantially as described.

24. The combination, with an upright closed retort, of an oil-delivery pipe extending to near the bottom of said retort, an outlet-pipe connected with the upper end, the heating-gas flues communicating with the upper part of the retort-chamber, and the take-off flues communicating with the lower part, substantially as described.

In testimony whereof I have signed this specification in the presence of two subscribing witnesses.

HENRY H. EDGERTON.

Witnesses:
  H. M. HYAMS,
  WM. F. ENGEL.